Figure 1:
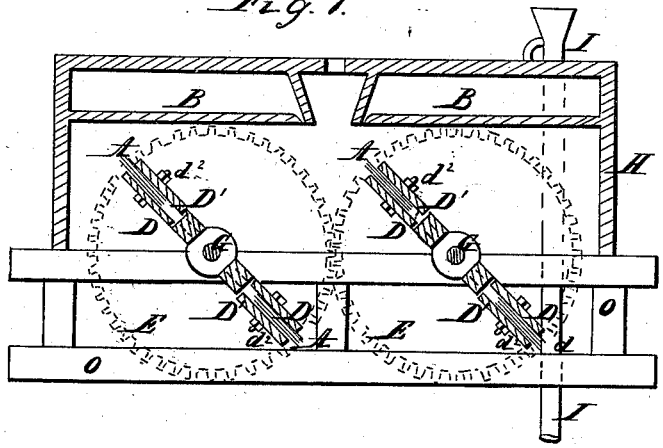
Figure 2:
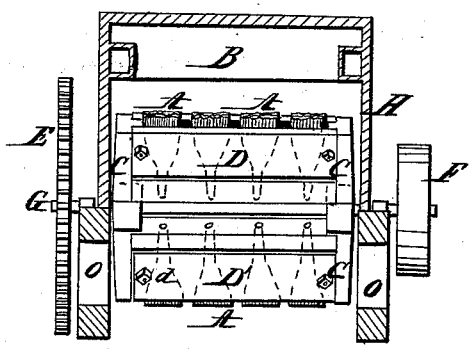

A. & G. F. Howard,
Scouring Leather,
№ 79,832. Patented July 14, 1868.

Witnesses:
Chas. F. Tabor
Russ. F. Tabor

Inventor:
Adolphus Howard
George F. Howard
by B. H. Muchle
their atty

United States Patent Office.

ADOLPHUS HOWARD, OF WELLSVILLE, NEW YORK, AND GEORGE F. HOWARD, OF CHICAGO, ILLINOIS, ASSIGNORS TO GEORGE F. HOWARD.

Letters Patent No. 79,832, dated July 14, 1868.

IMPROVED MACHINE FOR WASHING LEATHER.

The Schedule referred to in these Letters Patent and making part of the same.

TO ALL WHOM IT MAY CONCERN:

Be it known that we, ADOLPHUS HOWARD, of Wellsville, in the county of Allegany, and State of New York, and GEORGE F. HOWARD, of the city of Chicago, county of Cook, and State of Illinois, (assignors to the said GEORGE F. HOWARD,) have invented a new and useful Improvement in Machines for Washing Leather, for use in tanneries; and we do hereby declare that the following is a full, clear, and exact description thereof, reference being had to the accompanying drawings, making a part of this specification, in which—

Figure I is a sectional side elevation.

Figure II is a transverse vertical section.

The nature of this invention consists—

1. In the application and use of splint brooms in a machine for washing leather.
2. In the manner of attaching said splint brooms to a revolving shaft or shafts.

Letters of like name and kind refer to like parts in each of the figures.

This invention being an improvement in the construction of a machine for washing leather, for which Letters Patent of the United States were granted to us on the twenty-eighth day of May, A. D. 1867, for a particular description of such parts of said invention, shown in the accompanying drawings, but not claimed in specification annexed to said Letters Patent, reference is hereby made to the Letters Patent aforesaid.

A brief recapitulation of those parts is, therefore, deemed sufficient for the purpose of this application.

O, frame of the machine.

H, cover.

B B, water-tanks.

I, pump.

A A represent a series of splint brooms, which are attached to the revolving shafts G by means of the radial arms or disks, C, and adjusting-clamps D D'. There may be one, two, or more sets of brushes secured to an equal number of arms, using the same number of clamps for that purpose.

Each clamp consists of the stationary board D, firmly attached to the radial arms O, and a removable board D', adjusted with a set-screw or bolt, $d^2$. The splint brooms are placed between the two boards, and held firmly therein by the set-screw. E represents gearing, and F the main driving-pulley.

Splint brooms have heretofore been made and used for removing the sediment remaining upon a side of leather (after it has been removed from the vat) by hand; and since this manual labor has been superseded by the use of a revolving brush, driven by suitable machinery, the splint broom was abandoned and a hair-brush substituted, on account of its simple construction and mode of attachment.

Upon making practical experiments with our machine for washing leather, patented May 28th, 1867, we discovered that brushes, to be used for scrubbing leather by machinery, might be made of the same material used for brushing by hand, and with a better result, especially that one of the revolving brushes, which scours the flesh side of the leather, should be composed of splint brooms, or an equally hard and stout material. Hence—

What we claim as our invention, and desire to secure by these Letters Patent, is—

1. In a machine for washing leather, the application and use of splint brooms, substantially as and for the purposes herein described.

2. In a machine for washing leather, the clamps D D', or its equivalent, in combination with the radial arms or disks C upon the shaft G, for the purpose and substantially as described.

ADOLPHUS HOWARD,
GEORGE F. HOWARD.

Witnesses:
J. W. HOWARD,
B. H. MUEHLE.